United States Patent
Gu et al.

(10) Patent No.: US 11,500,362 B2
(45) Date of Patent: Nov. 15, 2022

(54) SHELF, DISPATCHING METHOD, DISPATCHING DEVICE AND OPERATION DISPATCHING SYSTEM

(71) Applicants: BEIJING JINGDONG SHANGKE INFORMATION TECHNOLOGY CO., LTD., Beijing (CN); BEIJING JINGDONG CENTURY TRADING CO., LTD., Beijing (CN)

(72) Inventors: Weiwei Gu, Beijing (CN); Jun Xiao, Beijing (CN); Jinhua Cai, Beijing (CN); Yanguang Liu, Beijing (CN); Chen Fan, Beijing (CN)

(73) Assignee: BEIJING JINGDONG ZHENSHI INFORMATION TECHNOLOGY CO., LTD., Beijing (CN)

( * ) Notice: Subject to any disclaimer, the term of this patent is extended or adjusted under 35 U.S.C. 154(b) by 305 days.

(21) Appl. No.: 16/641,831

(22) PCT Filed: Jul. 16, 2018

(86) PCT No.: PCT/CN2018/095737
§ 371 (c)(1),
(2) Date: Feb. 25, 2020

(87) PCT Pub. No.: WO2019/052277
PCT Pub. Date: Mar. 21, 2019

(65) Prior Publication Data
US 2020/0218245 A1    Jul. 9, 2020

(30) Foreign Application Priority Data
Sep. 15, 2017  (CN) .......................... 201710831277.2

(51) Int. Cl.
*G05B 19/418*     (2006.01)
*G06Q 10/06*      (2012.01)
*G06Q 10/08*      (2012.01)

(52) U.S. Cl.
CPC ....... *G05B 19/41895* (2013.01); *G06Q 10/06* (2013.01); *G06Q 10/08* (2013.01)

(58) Field of Classification Search
CPC .............................. G06Q 10/06; G06Q 10/08
(Continued)

(56) References Cited

U.S. PATENT DOCUMENTS 5,582,497 A * 12/1996 Noguchi .............. B65G 1/1373
                                                     700/214
8,892,241 B2 * 11/2014 Weiss ...................... B66F 9/063
                                                     700/229
(Continued)

FOREIGN PATENT DOCUMENTS

CN      2851187 Y    12/2006
CN    202201414 U     4/2012
(Continued)

OTHER PUBLICATIONS

Office Action dated Jan. 12, 2022 in corresponding Indian Patent Application No. 202037008043 (with English Translation), 6 pages.

(Continued)

*Primary Examiner* — Md Azad
(74) *Attorney, Agent, or Firm* — Oblon, McClelland, Maier & Neustadt, L.L.P.

(57) ABSTRACT

A shelf, a dispatching method, a dispatching device, and an operation dispatching system relating to the field of intelligent warehousing technology, the shelf including: a storage device for placing an article; a motion device for moving the shelf; a power device for providing energy to the motion device; a communication device configured to communicate (Continued)

with a control center; and a controller that controls communication of the communication device with the control center and controls motion of the motion device.

18 Claims, 5 Drawing Sheets

(58) Field of Classification Search
USPC .......................................................... 700/228
See application file for complete search history.

(56) References Cited

U.S. PATENT DOCUMENTS

| | | | | |
|---|---|---|---|---|
| 8,972,045 | B1* | 3/2015 | Mountz | G06Q 10/08 |
| | | | | 700/229 |
| 10,007,890 | B1* | 6/2018 | Purwin | B64D 1/22 |
| 10,138,060 | B1* | 11/2018 | Mantha | B25J 15/0253 |
| 2017/0270466 | A1* | 9/2017 | Kao | G05D 1/0217 |
| 2020/0184411 | A1* | 6/2020 | Shah | G06V 20/10 |
| 2020/0273306 | A1* | 8/2020 | Saito | G06Q 10/08 |

FOREIGN PATENT DOCUMENTS

| | | |
|---|---|---|
| CN | 102602643 A | 7/2012 |
| CN | 202542300 U | 11/2012 |
| CN | 103738640 A | 4/2014 |
| CN | 104460628 A | 3/2015 |
| CN | 104555222 A | 4/2015 |
| CN | 104809606 A | 7/2015 |
| CN | 105184525 A | 12/2015 |
| CN | 105225090 A | 1/2016 |
| CN | 105353759 A | 2/2016 |
| CN | 106483943 A | 3/2017 |
| CN | 106516537 A | 3/2017 |
| CN | 107577212 A | 1/2018 |

OTHER PUBLICATIONS

International Search Report dated Aug. 29, 2018 in PCT/CN2018/095737 filed on Jul. 16, 2018, 2 pages.
Chinese Office Action dated Mar. 11, 2019 in Chinese Application 201710831277.2 filed on Sep. 15, 2017, 9 pages.

* cited by examiner

SHELF, DISPATCHING METHOD, DISPATCHING DEVICE AND OPERATION DISPATCHING SYSTEM

CROSS-REFERENCE TO RELATED APPLICATIONS

This application is a United States national stage application of International Application No. PCT/CN2018/095737, filed Jul. 16, 2018, which designates the United States, and claims priority to Chinese patent application No. 201710831277.2 filed on Sep. 15, 2017, and the entire contents of each of the above applications are hereby incorporated herein by reference in entirety.

TECHNICAL FIELD

The present disclosure relates to the field of intelligent warehousing technology, in particular to a shelf, a dispatching method, a dispatching device, and an operation dispatching system.

BACKGROUND

With the development of artificial intelligence technology, unmanned warehousing technology has become a general trend. It is desirable that the delivery and distribution of article can be implemented in an unmanned intervention manner to reduce the labor cost, improve the efficiency, and at the same time reduce problems such as false delivery due to manual mistake.

SUMMARY

According to some embodiments of the present disclosure, a shelf is provided. The shelf comprises: a storage device for placing an article; a motion device for moving the shelf; a power device for providing energy to the motion device; a communication device configured to communicate with a control center; and a controller that controls communication of the communication device with the control center and controls motion of the motion device.

In some embodiments, the controller is configured to drive the motion device to move the shelf according to a path information in a dispatching instruction, in the case that the communication device receives the dispatching instruction from the control center.

In some embodiments, the shelf further comprises: an article sensor that detects a storage state of each part of the storage device; wherein the controller is configured to send a path planning request to the control center through the communication device in the case that it is determined a quantity of the article in the storage device has reached a predetermined threshold according to detection data of the article sensor, and receive a dispatching instruction which is generated by performing path planning by the control center according to a location of the shelf and a location of a delivery vehicle.

In some embodiments, the storage device comprises at least one of the following structures: a telescopic structure that adjusts a size of a storage space according to a control signal from the controller; or a separator that adjusts its position in the storage space according to the control signal from the controller.

In some embodiments, the shelf further comprising one or more of the following structures: a tag to be identified by at least one of an article sorting device or a staff; a display device that displays at least one of a storage state of the storage device or an endurance of the power device; or a lighting device that adjusts a brightness of an illuminated area according to an ambient light condition.

In some embodiments, the controller is further configured to perform at least one of the following operations in the case that an endurance of the power device reaches a predetermined lower limit: controlling the motion device to move the motion device to reach an energy charging area so as to charge energy; or controlling the power device to charge energy.

In some embodiments, the shelf conforms to one or more of the following conditions: the motion device is located at the bottom of the shelf; a lower area of the storage device is a large article loading area; or the shelf has a height no more than 2 meters.

According to other embodiments of the present disclosure, a dispatching method is provided. The dispatching method comprises: obtaining, by a shelf, a dispatching instruction from a control center; obtaining a path information from the dispatching instruction; and driving a motion device of the shelf to lead to a motion of the shelf according to the path information.

In some embodiments, the dispatching method further comprises: obtaining a storage state of the shelf; sending a path planning request to the control center in the case that a quantity of the carried article on the shelf reaches a predetermined threshold, so that the control center performs path planning according to a location of the shelf and a location of a delivery vehicle, and feeds back the dispatching instruction.

In some embodiments, the quantity of the carried article on the shelf reaches the predetermined threshold comprises at least one of the followings: the quantity of the carried article on the shelf reaches a predetermined maximum value during a loading process; or the article on the shelf is cleared during an unloading process.

In some embodiments, the dispatching method further comprises at least one of the following: adjusting a telescopic structure to adjust a size of a storage space according to a telescopic structure adjustment instruction from the control center; or adjusting a location of a separator in the storage space according to a separator adjustment instruction from the control center.

In some embodiments, the dispatching method further comprises: obtaining an endurance of the shelf; performing at least one of the following operations when the endurance reaches a predetermined endurance threshold: controlling the shelf to reach an energy charging area to charge energy, or controlling a power device of the shelf to charge energy.

According to further embodiments of the present disclosure, a dispatching method is provided. The dispatching method comprises: obtaining a location information of a shelf and a location information of a delivery vehicle; planning a path according to the location information of the shelf and the location information of the delivery vehicle to obtain a path information; and sending a dispatching information including the path information to the shelf.

In some embodiments, obtaining the location information of the delivery vehicle comprises: determining identifiers of target delivery stations of delivery vehicles according to identifiers of the delivery vehicles; determining a delivery vehicle heading for a target delivery station according to an identifier of the target delivery station; and obtaining a location information of the delivery vehicle heading for the target delivery station.

In some embodiments, planning path and sending a dispatching information to the shelf in the case of obtaining at least one of a dispatching request from the shelf or a dispatching operation from a staff.

In some embodiments, the dispatching method further comprises at least one of the following: sending an article loading instruction to an article sorting device which corresponding to an identifier of the shelf in the case that the shelf is located at a warehousing station; sending an unloading instruction to the article sorting device in the case that the shelf is located at a delivery station; obtaining a location information of the shelf and a target location information of the shelf at the warehousing station in the case that the delivery vehicle arrives at the warehousing station; performing path planning, and sending a get-off instruction including a path information to the shelf; or obtaining the location information of the shelf and the target location information of the shelf at the delivery station in the case that the delivery vehicle arrives at the delivery station; performing path planning, and sending a get-off instruction including a path information to the shelf.

According to other embodiments of the present disclosure, a dispatching device is provided. The device comprises: a memory; and a processor coupled to the memory, wherein the processor is configured to perform a method according to any dispatching method mentioned hereinbefore based on instructions stored in the memory.

According to some embodiments of the present disclosure, a computer readable storage medium is also provided. The computer readable storage medium having stored thereon computer program instructions which, when executed by a processor, implement steps of a method according to any dispatching method mentioned hereinbefore.

According to some embodiments of the present disclosure therein, an operation dispatching system is provided. The operation dispatching system comprises: any shelf according to any shelf mentioned hereinbefore; an operation dispatching center configured to execute a dispatching method according to any dispatching method that is executed by a non-shelf side mentioned hereinbefore.

In some embodiments, the operation dispatching system further comprises: an article sorting device configured to perform at least one of the following functions of: loading an article to the shelf; or unloading the article from the shelf.

In some embodiments, the operation dispatching system further comprises a delivery vehicle configured to send a location information to the operation dispatching center, move between a warehousing station and a delivery station according to a path planning result of the operation dispatching center based on a distribution instruction of the operation dispatching center, and send a get-off request of the shelf to the operation dispatching center when a target location is arrived.

BRIEF DESCRIPTION OF THE DRAWINGS

The drawings described herein are used to provide a further understanding of the present disclosure and constitute a part of the present disclosure. The illustrative embodiments of the present disclosure as well as the descriptions thereof, which are used for explaining the present disclosure, do not constitute improper definitions on the present disclosure. In the accompanying drawings.

DETAILED DESCRIPTION

The technical solution of the present disclosure is further described in detail by means of the drawings and embodiments.

Figure 1:
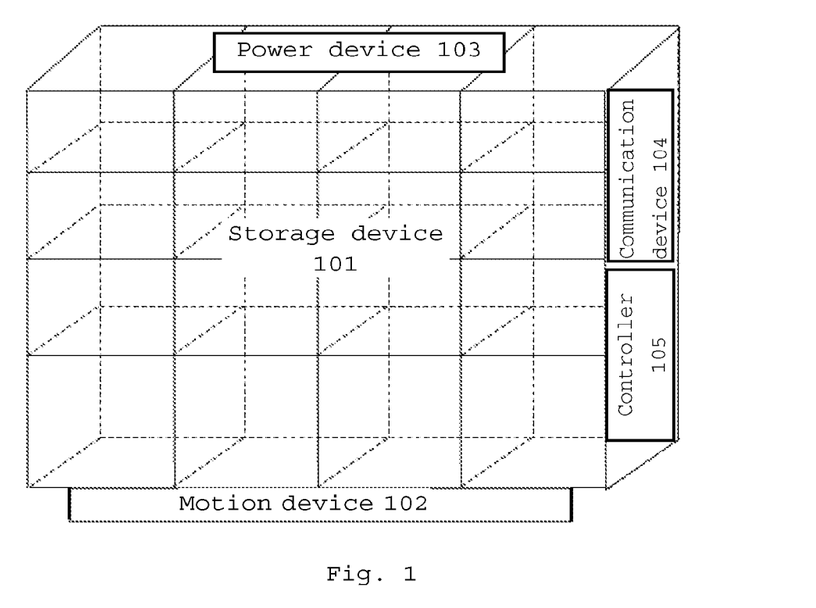
FIG. 1 is a schematic view of some embodiments of the shelf according to the present disclosure.

FIG. 1 shows a schematic view of some embodiments of a shelf according to the present disclosure. The shelf comprises a storage device 101, a motion device 102, a power device 103, a communication device 104, and a controller 105.

The storage device 101 occupies most space of the shelf for placing an article. In some embodiments, the storage space may be spatially, and large articles are placed in a lower area, thereby the stability of the shelf is improved.

The motion device 102 which may be located at the bottom of the shelf, is a wheel or other structure, such as a magnetic suspension motion device, a movement structure matching the track, and the like, that are able to drive a motion of the shelf. In some embodiments, the motion device may be located on the top or side surface of the shelf according to different settings of the warehousing station or the delivery station.

The power device 103 which may be a battery or other energy storage device, is configured to provide energy for the motion device 102. In some embodiments, the power device 103 may be located on a top of the shelf, as shown in FIG. 1, and may also be located at any location such as a bottom or a side surface of the shelf.

The communication device 104 can communicate with a control center. During the communication, the communication device 104 may provide a unique identifier of the shelf to the control center so that the control center can identify the shelf. The communication device may be located at any location of the shelf.

The controller 105 can control the communication device to communicate with the control center, control the motion of the motion device, including sending a condition of the shelf to the control center via the communication device, and receiving a message from the control center via the communication device, and analyzing a path information according to instructions from the control center so as to drive the motion of the motion device 102. The controller may be located at any location of the shelf.

Such a shelf has a power device and a motion device besides its storage function which can be moved under the control of the controller, thereby eliminating manual practice of transport and layout between the warehousing station and the delivery vehicle, or between the delivery station and the delivery vehicle, so as to reduce manual involvement and improve the distribution efficiency of the article.

In some embodiments, the height of the shelf may be determined, e.g. to be no more than 2 meters, according to the height of the delivery vehicle, so as to ensure the stability of the shelf, and enable safe movement between the delivery station and the warehousing station when taken by the delivery vehicle.

Figure 2:
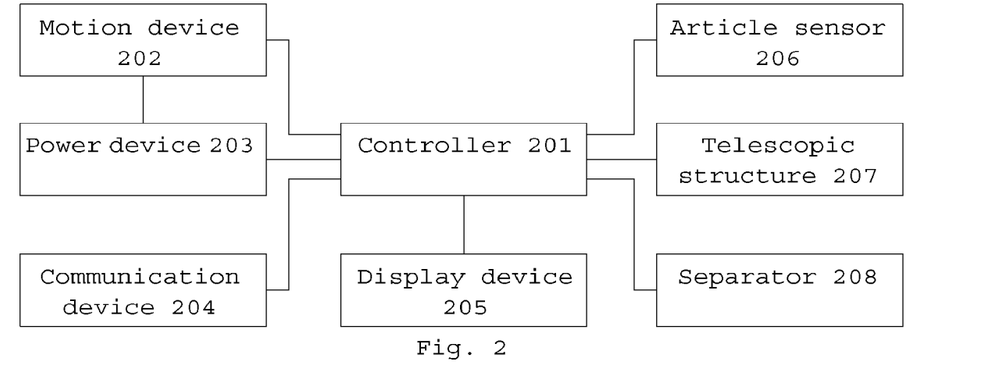
FIG. 2 is a schematic view of other embodiments of the shelf according to the present disclosure.

FIG. 2 shows a schematic view of other embodiments of the shelf according to the present disclosure. FIG. 2 exhibits a signal connection condition between the controller and other various parts. The structures and functions of the controller 201, the motion device 202, the power device 203, and the communication device 204 are similar to those in the embodiment shown in FIG. 1.

In some embodiments, the power device 203 has an energy charging interface. When an energy reserve of the power device 203 reaches a predetermined endurance threshold, a message can be sent to the controller 201 which controls the energy charging interface of the power device 203 to connect with an energy source to charge energy. In some embodiments, the controller 201 may also control the motion device 202 to drive the shelf to reach a predetermined location, so as to facilitate the power device 203 to charge energy. Such shelf can perceive itself's energy state in time to prevent that the delivery of the article is affected by lacking energy.

The shelf may also comprise an article sensor 206 capable of sensing a storage state of various parts of the storage device. The article sensor 206 may sense whether its sensing area has already been loaded with the article, or may sense the volume or weight of the carried article, so as to provide to the controller 201 for comparing with a carrying capacity of the storage device. When the controller 201 determines that the quantity of the article in the storage device reaches a predetermined threshold according to the data fed back from the article sensor 206, a message can be sent to the controller, the controller 201 sends a path planning request to the control center through the communication device 204. In some embodiments, during the process of unloading article from the shelf, when the article sensor 206 senses that there is no more article on the shelf, a message is sent to the controller 201, and the controller 201 sends a path planning request to the control center through the communication device 204. Such shelf can automatically sense a load state of the shelf, so that the shelf can positively request to perform path planning, thereby avoiding excessive load of the shelf, and improving the delivery efficiency of the shelf.

In some embodiments, the storage device may include a telescopic structure 207 capable of adjusting the size of the storage device as needed, for example adjusting the height of each layer, the overall length, width of the shelf or the like, so as to avoid that the article is oversized for being placed into the shelf, and also enable reducing the size of the shelf as much as possible in the case of that the article has a large density and a small volume, so that the delivery vehicle can carry more shelves and delivery efficiency is improved. The telescopic structure may be controlled by the controller for adjustment according to a detecting information of the article sensor 206, and may also be controlled by the controller for adjustment under an instruction of the control center.

In some embodiments, the storage device may further include a separator 208 capable of adjusting its position. The separator 208 which is located in the storage space, can produce the effect of separating the space, and can also reduce the collision between different articles. The position of the separator may be controlled by the controller for adjustment according to the detecting information of the article sensor 206, or may also be controlled by the controller for adjustment under the instructions of the control center. The separators with an adjustable position can adapt the partitions of the storage space to the needs of the size of the articles, to make full use of the space inside the storage device and improve the transport efficiency of the article, and can also reduce a shaking of the article on the shelf, and improve the safety quality of the article.

In some embodiments, the shelf may further comprise a display device 205, which capable of displaying an energy state, a shelf identifier, a storage state (e.g. in which partition an article has been placed) and the like, thereby an inspection and maintenance by the staff is facilitated.

In some embodiments, the shelf may also comprise a tag (such as a QR code identifier) attached to a surface, or a radio frequency tag that may be sensed, and the like. On the one hand, it is possible to facilitate being identified by the staff, and on the other hand, it is also possible to facilitate being identified by a automatic sorting device. In particular, when the automatic sorting device cannot obtain a shelf location from the control center, it is possible to identify the shelf according to the tag. In some embodiments, if the tag is a graphic tag, it may be displayed on the display device 205.

In some embodiments, in order to facilitate being identified by the staff or the automatic sorting device, a lighting device may be configured to illuminate a tag area. The lighting device may adjust brightness according to an ambient light condition, thereby achieving an energy saving effect.

Figure 3:
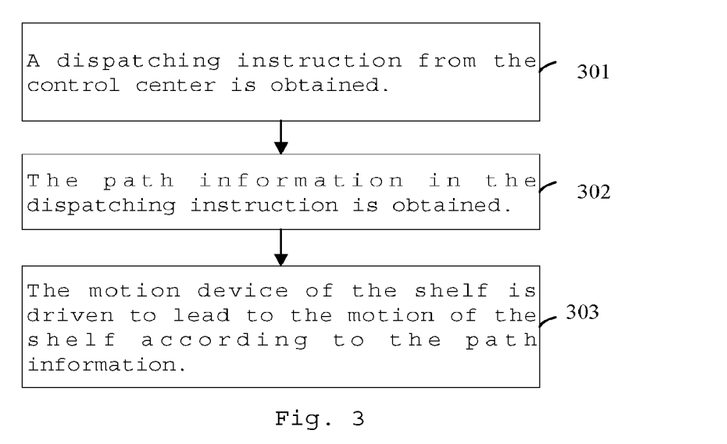
FIG. 3 is a flow chart of some embodiments of the dispatching method according to the present disclosure.

FIG. 3 shows a flow chart of some embodiments of the dispatching method according to the present disclosure.

In step 301, the shelf obtains a dispatching instruction from the control center. In some embodiments, the dispatching instruction may be an instruction indicating motion of the shelf, including getting on or getting off the vehicle.

In step 302, the path information in the dispatching instruction is obtained. In some embodiments, the control center may perform path planning according to the current location and the target address of the shelf, and the shelf analyzes the dispatching instruction, and obtains the path information planned by the control center.

In step 303, the motion device of the shelf is driven to lead to the motion of the shelf according to the path information.

By way of such method, the shelf can be moved under the dispatch of the control center according to the path determined by the control center, thereby eliminating manual practice of transport and layout between the warehousing station and the delivery vehicle, or between the delivery station and the delivery vehicle, so as to reduce manual involvement and improve the distribution efficiency of the article.

In some embodiments, it is possible to positively send a dispatching instruction by the control sensor to the shelf, and it is possible to set a predetermined frequency or a predetermined time as needed, or send a dispatching instruction to the shelf completely by a manual control. Such method can facilitate the cooperation among multiple shelves in the case that the delivery vehicle is loaded with multiple shelves, to ensure the delivery time of the delivery vehicle, and facilitate uniform configuration and management.

In some embodiments, when the shelf is located on the delivery vehicle and the delivery vehicle reaches the target location, the control center determines the target location of the shelf at the delivery station or the warehousing station according to the current location of the delivery vehicle, and performs path planning in conjunction with the location of the shelf, and sends a get-off instruction to the shelf. In some embodiments, the control center may first issue a door opening and/or a ramp erection instruction to the delivery vehicle, so as to facilitate the shelf to get off the vehicle.

By way of such method, it is possible to implement the shelf not only to get on the vehicle automatically, but also to get off automatically and reach a specified place of the delivery station or the warehousing station, so that the degree of automation is improved, and the efficiency is raised.

Figure 4:
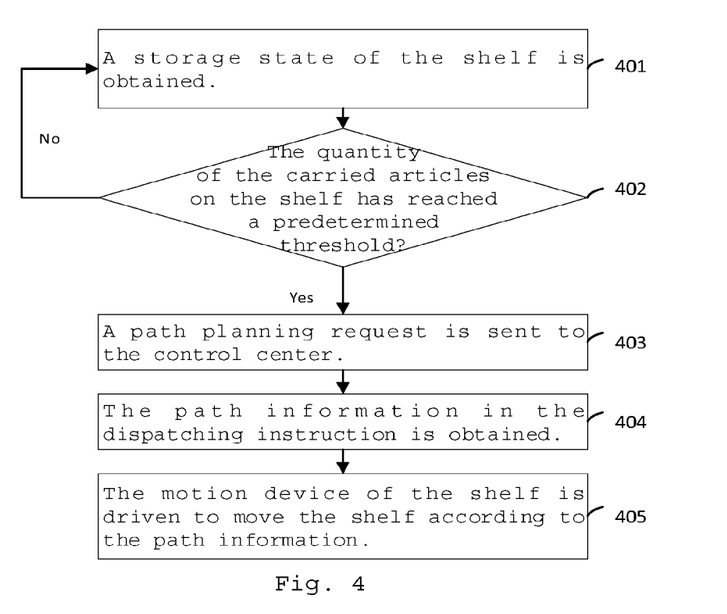
FIG. 4 is a flow chart of other embodiments of the dispatching method according to the present disclosure.

FIG. 4 shows a flow chart of other embodiments of the dispatching method according to the present disclosure, which comprises steps 401 to 405.

In step 401, a shelf storage state is obtained. When the shelf is located at the warehousing station, the article is loaded onto the shelf; when the shelf is located at the delivery station, the article is unloaded from the shelf.

In step 402, it is determined whether the quantity of the carried article on the shelf has reached a predetermined threshold. When the predetermined threshold is reached, the step 403 is performed. Otherwise, the step 401 is performed. When the shelf is located at the warehousing station, it is determined whether the article in the shelf has been fully loaded, or an upper quantity limit of the article has been reached, wherein the upper quantity limit of the article is an upper limit in the predetermined threshold. When the shelf is located at the delivery station, it is determined whether the article in the shelf has been cleared, wherein being cleared is a lower limit in the predetermined threshold.

In step 403, a path planning request is sent to the control center, so that the control center performs path planning according to the location of the shelf and the location of the delivery vehicle, then feeds back a dispatching instruction. When the shelf is located at the warehousing station or the delivery station, the control center performs path planning according to the location of the shelf and the location of the delivery vehicle, and then sends the result to the shelf through the dispatching information.

In step 404, the path information in the dispatching instruction is obtained.

In step 405, the motion device of the shelf is driven to lead to a motion of the shelf according to the path information.

By such method, it is possible to perform dispatching in time when the quantity of the article in the shelf reaches a predetermined amount, thereby the utilization rate of the space of the shelf is improved, and the delivery efficiency is also improved.

In some embodiments, during the loading of the article, the shelf may adjust the telescopic structure in the shelf according to a control instruction from the control center, so as to adjust the size of the storage space; and may adjust the position of the separator in the shelf according to the control instruction from the control center, so as to adjust the separation of the storage space, thereby the utilization rate of the space of the shelf and the delivery efficiency of the article is improved.

In some embodiments, after unloading of the article is completed, the shelf may adjust the telescopic structure to reduce the size of the shelf, thereby the transportation of the delivery vehicle is facilitated, and also the shuttle times of the delivery vehicle is also reduced to achieve an energy saving effect.

In some embodiments, after an energy charging instruction from the control center is received, it is possible to reach the energy charging area for charging electricity or other energy according to the path planning information in the instruction, so as to ensure continuous operation of the system.

Figure 5:
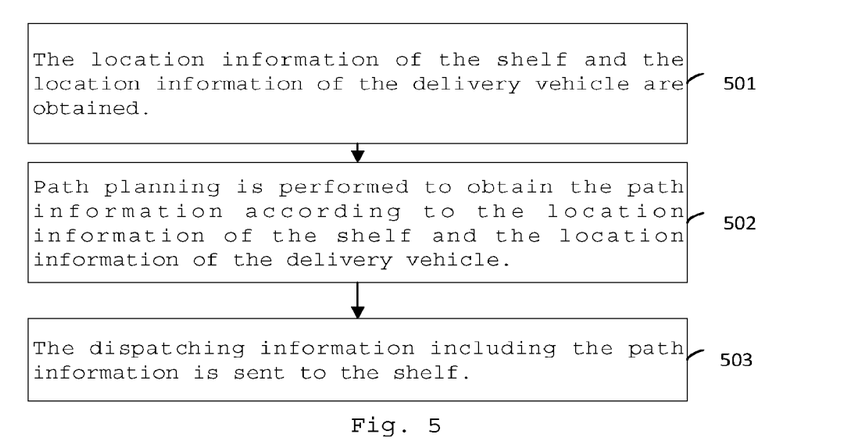
FIG. 5 is a flow chart of further embodiments of the dispatching method according to the present disclosure.

FIG. 5 shows a flow chart of further embodiments of the dispatching method according to the present disclosure, which comprises steps 501 to 503.

In step 501, the control center obtains the location information of the shelf and the location information of the delivery vehicle. The shelf might be located at a location of the warehousing station or delivery station, while the delivery vehicle is located in a parking lot of the corresponding station.

In step 502, the control center performs path planning to obtain the path information according to the location information of the shelf and the location information of the delivery vehicle.

In step 503, the control center sends the dispatching information which includes the path information to the shelf.

By way of such method, it is possible to plan a path and send motion instructions to the shelf, so that it is implemented that the shelf automatically moves from and to the delivery vehicle, thereby eliminating manual practice of transport and layout between the warehousing station and the delivery vehicle, or between the delivery station and the delivery vehicle, so as to reduce manual involvement and improve the distribution efficiency of the article.

Figure 6:
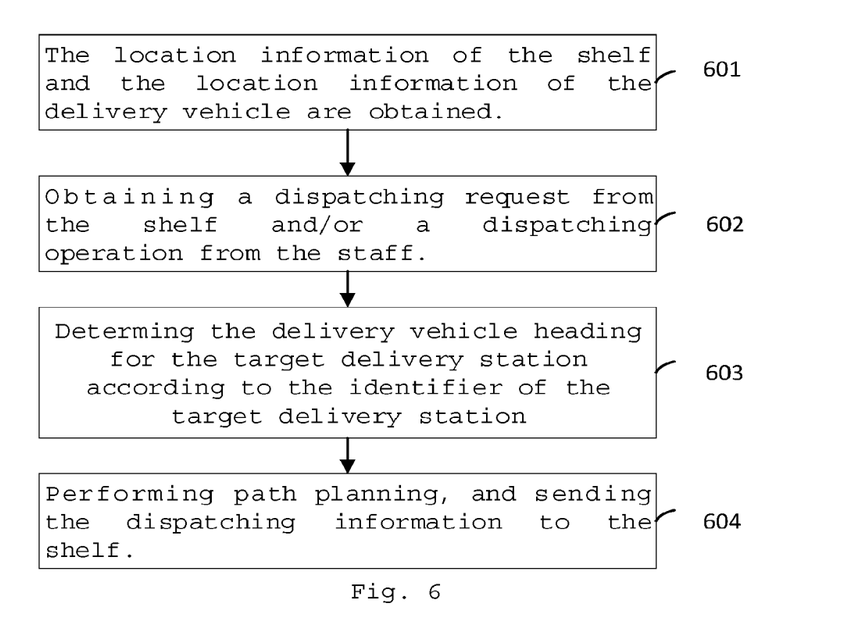
FIG. 6 is a flow chart of still other embodiments of the dispatching method according to the present disclosure.

FIG. 6 shows a flow chart of still other embodiments of the dispatching method according to the present disclosure, which comprises steps 601 to 604.

In step 601, the control center obtains the location information of the shelf and the location information of the delivery vehicle.

In step 602, the control center obtains a dispatching request from the shelf or obtains a dispatching operation from the staff.

In step 603, the control center determines the delivery vehicle heading for the target delivery station according to the identifier of the target delivery station; selects a delivery vehicle with a suitable time, size, or remaining space from the delivery vehicles matching the address which the shelf is heading for, and then obtains the location information of the delivery vehicle.

In step 604, the control center performs path planning according to the location information of the shelf and the location information of the delivery vehicle, and then sends the dispatching information which includes the path information to the shelf.

By way of such method, it is possible to dispatch the shelf in time, and improve the efficiency; and it is possible to select the delivery vehicle by means of identifier matching, so that the overall management is facilitated, and the controllability of the system is improved.

In some embodiments, the control center sends an article loading instruction to the corresponding article sorting device according to the identifier of the shelf when the shelf is located at the warehousing station; sends an unloading instruction to the article sorting device when the shelf is located at the delivery station. When the delivery vehicle arrives at the warehousing station, the location information of the shelf and the target location information of the shelf at the warehousing station are obtained, and path planning is performed to send the get-off instruction including the path information to the shelf; when the delivery vehicle arrives at the delivery station, the location information of the shelf and the target location information of the shelf at the delivery station are obtained, and path planning is performed to send the get-off instruction including the path information to the shelf.

By way of such method, it is possible to implement fully automated processing of shelf loading, unloading, and get-off, thereby the manual involvement is reduced, the degree of automation is improved, and the probability of errors is also lessened.

In some embodiments, the control center may also send an energy charging instruction according to the endurance of the shelf, so that the shelf is charged with energy in time to ensure the normal operation of the system.

In some embodiments, the control center may also determine the difference between the size of the storage device in the shelf and the size of the article according to a detection result of the sensor, and adjust the telescopic structure and/or separator of the shelf to improve the space utilization, and reduce the collision, thereby the delivery efficiency is improved whilst also a guarantee of improving the safety of the article is enabled.

Figure 7:
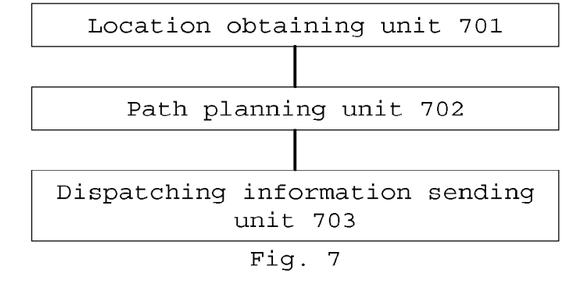
FIG. 7 is a schematic view of some embodiments of the dispatching device according to the present disclosure.

FIG. 7 shows a schematic view of some embodiments of the dispatching device according to the present disclosure. The dispatching device may be located in the control center hereinbefore, and then executes the functions of the dispatching method performed by the control center hereinbefore. The dispatching device comprises a location obtaining unit 701 which can obtain the location information of the shelf and the location information of the delivery vehicle. The path planning unit 702 is capable of obtaining the path information according to the location information of the shelf and the location information of the delivery vehicle. The dispatching information sending unit 703 is capable of sending the dispatching information including the path information to the shelf.

Such dispatching device can perform the path planning and send the motion instruction to the shelf, so that it is implemented that the shelf automatically moves from and to the delivery vehicle, thereby eliminating manual practice of transport and layout between the warehousing station and the delivery vehicle, or between the delivery station and the delivery vehicle, so as to reduce manual involvement and improve the distribution efficiency of the article.

Figure 8:
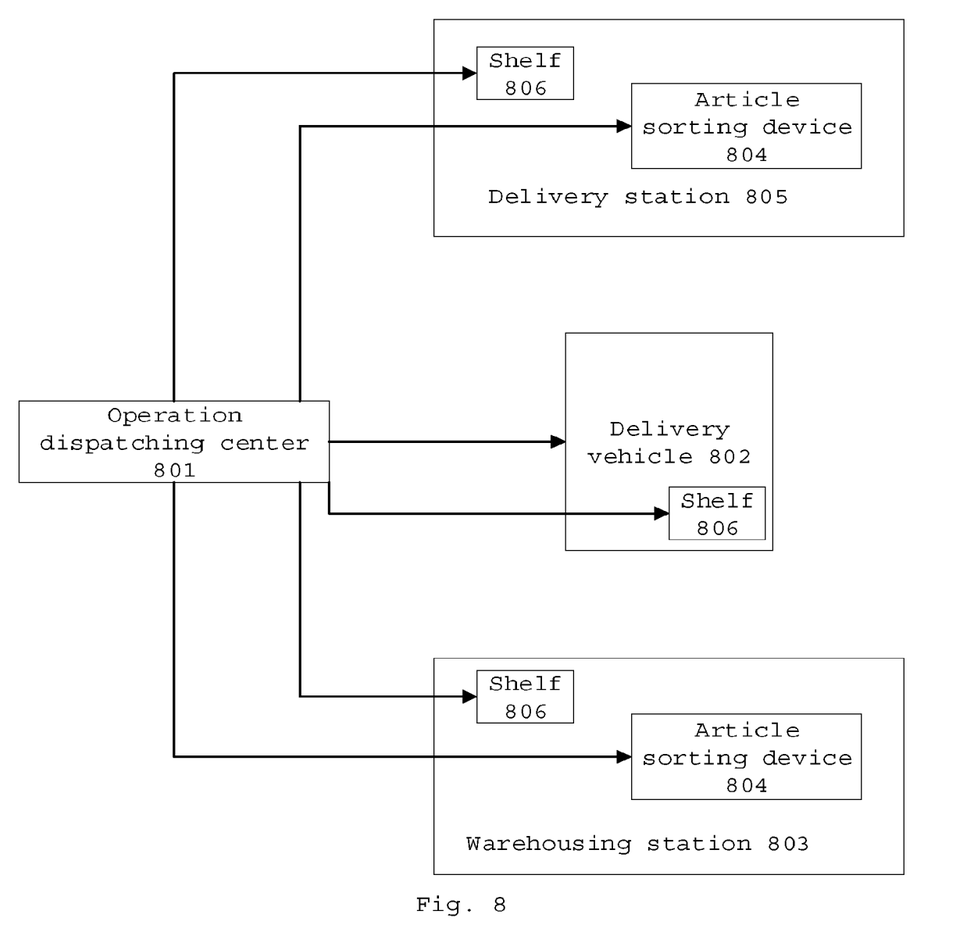
FIG. 8 is a schematic view of some embodiments of the operation dispatching system according to the present disclosure.

FIG. 8 shows a schematic view of some embodiments of the operation dispatching system according to the present disclosure. The operation dispatching system comprises an operation dispatching center 801, a shelf 806, and a delivery vehicle 802. The operation dispatching center 801 may execute any of the dispatching methods performed by the control center hereinbefore; the delivery vehicle 802 shuttles between the delivery station 805 and the warehousing station 803.

When the shelf 806 is located at the warehousing station 803, the operation dispatch center 801 sends an article loading instruction to the corresponding article sorting device according to the identifier of the shelf 806.

When the quantity of the article on the shelf 806 reaches a predetermined upper limit, or a predetermined dispatching moment is reached, the operation dispatch center 801 performs path planning according to the location of the determined delivery vehicle 802 and the location of the shelf 806, and sends a get-on instruction to the shelf 806, thus the shelf 806 arrives at the delivery station by taking the delivery vehicle 802.

When the delivery vehicle arrives at the delivery station, the location information of the shelf and the target location information of the shelf at the delivery station are obtained, and path planning is performed, and a get-off instruction which includes the path information is sent to the shelf.

When the shelf is located at the delivery station, an unloading instruction is sent to the article sorting device.

When the shelf completes the unloading, the operation dispatch center 801 performs path planning according to the location of the determined delivery vehicle 802 and the location of the shelf 806, and sends the get-on instruction to the shelf 806, the shelf 806 arrives at the warehousing station by taking the delivery vehicle 802.

When the delivery vehicle arrives at the warehousing station, the location information of the shelf and the target location information of the shelf at the warehousing station are obtained, and path planning is performed, and the get-off instruction which includes the path information is sent to the shelf.

Such operation dispatching system can implement automatic motion of the shelf between the warehousing station and the delivery vehicle, or between the delivery station and the delivery vehicle, so as to reduce manual involvement in this link and improve the distribution efficiency of the article.

In some embodiments, the operation dispatching system may further comprise an article sorting device 804 located at the delivery station 805 or the warehousing station 803 or both of them, which can load and unload the article according to an instruction of the operation dispatching center 801. In some embodiments, the operation dispatching center 801 determines the delivery station or target address which the shelf 806 is heading for, and then controls the article sorting device 804 to load or unload the corresponding article.

Such operation dispatching system implements the automated processing of loading and unloading, thereby manpower is reduced, and the degree of automation is improved.

In some embodiments, the operation dispatching system may also perform path planning according to the target address of the delivery vehicle, and control operations such as opening the door, starting, closing the door of the delivery vehicle and the like, and cooperate with the control operation to the shelf, thereby automatic connection of the shelf with the delivery vehicle is implemented, and the delivery efficiency of the article is improved.

Figure 9:
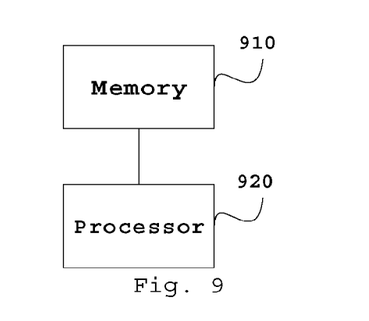
FIG. 9 is a schematic view of other embodiments of the operation dispatching system according to the present disclosure.

FIG. 9 shows a schematic structural view of some embodiments of the operation dispatching system according to the present disclosure. Each part of the operation dispatching system (such as the operation dispatching center, the shelf, and the delivery vehicle) includes a memory 910 and a processor 920 respectively. Wherein: the memory 910 may be a magnetic disk, a flash memory, or any other non-volatile storage medium. The memory is configured to store instructions in a corresponding embodiment of the operation dispatching method hereinafter. The processor 920 which is coupled to the memory 910, may be implemented as one or more integrated circuits, such as a microprocessor or a microcontroller. The processor 920 which is configured to execute instructions stored in the memory, can implement automatically dispatching the article between a station and a delivery vehicle.

Figure 10:
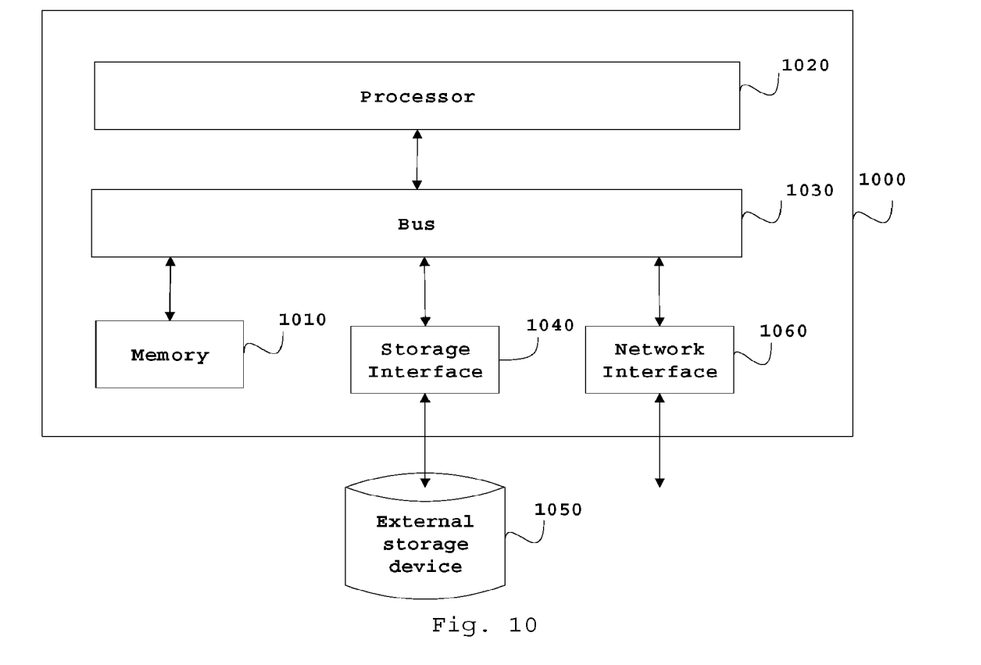
FIG. 10 is a schematic view of further embodiments of the operation dispatching system according to the present disclosure.

In some embodiments, it may also be that, as shown in FIG. 10, each part of the operation dispatching system 1000 may also include a memory 1010 and a processor 1020 respectively. The processor 1020 is coupled to the memory 1010 via a bus 1030. The operation dispatching system 1000 may also be connected to the external storage device 1050 via a storage interface 1040 for calling external data, and may also be connected to the network or another computer system (not shown) via the network interface 1060. It will not be introduced in detail here.

In this embodiment, it is possible to implement automatically dispatching the article between a station and a delivery vehicle by storing data instructions by the memory, and then by processing the above-described instructions by the processor.

In other embodiments, a computer readable storage medium has stored thereon computer program instructions which, when executed by a processor, implement the steps of the method in the embodiments corresponding to a dispatching method. Those skilled in the art will appreciate that the embodiments of the present disclosure may be provided as a method, device, or computer program product. Accordingly, the present disclosure may take the form of an entirely hardware embodiment, an entirely software embodiment, or a combination of software and hardware aspects. Moreover, the present disclosure may take the form of a computer program product embodied in one or more computer-usable non-transitory storage media (including but not limited to disk memory, CD-ROM, optical memory, and the like) containing computer usable program codes therein.

The present disclosure is described with reference to the flowcharts and/or block diagrams of methods, devices (systems), and computer program products according to the embodiments of the present disclosure. It will be understood that each step and/or block of the flow charts and/or block diagrams as well as a combination of steps and/or blocks of the flow charts and/or block diagrams may be implemented by a computer program instruction. These computer program instructions may be provided to a processor of a general purpose computer, special purpose computer, an embedded processing machine, or other programmable data processing devices to produce a machine, such that the instructions executed by a processor of a computer or other programmable data processing devices produce a device for realizing a function designated in one or more steps of a flow chart and/or one or more blocks in a block diagram.

These computer program instructions may also be stored in a computer readable memory that can guide a computer or other programmable data processing device to operate in a manner, such that the instructions stored in the computer readable memory produce a manufacture including an instruction device. The instruction device realizes a function designated in one or more steps in a flow chart or one or more blocks in a block diagram.

These computer program instructions may also be loaded onto a computer or other programmable data processing devices, such that a series of operational steps are performed on a computer or other programmable device to produce a computer-implemented processing, such that the instructions executed on a computer or other programmable devices provide steps for realizing a function designated in one or more steps of the flow chart and/or one or more blocks in the block diagram.

Heretofore, the present disclosure has been described in detail. Some details well known in the art are not described to avoid obscuring the concept of the present disclosure. According to the above description, those skilled in the art would fully know how to implement the technical solutions disclosed herein.

The method and device of the present disclosure may be implemented in many manners. For example, the method and device of the present disclosure may be implemented by a software, hardware, firmware, or any combination of a software, hardware, and firmware. The above-described sequence of steps for the method is for illustrative purposes only, and the steps of the method of the present disclosure are not limited to the sequence specifically described above unless otherwise specifically stated. Moreover, in some embodiments, the present disclosure may also be embodied as programs recorded in a recording medium, which include machine readable instructions for implementing the method according to the present disclosure. Thus, the present disclosure also covers recording medium storing programs for performing the method according to the present disclosure.

Finally, it should be explained that: the aforementioned embodiments are only used to describe the technical solution of the present disclosure rather than limiting the same; although detailed explanations are made to the present disclosure by referring to preferred embodiments, a common technical person in the art should understand that: it is still possible to make amendments to the embodiments of the present disclosure or make equivalent replacements to part of the technical features; without departing from the spirit and scope of the present disclosure, they should all be covered in the scope of the technical solution for which protection is sought in the present disclosure.

What is claimed is:

1. A shelf, comprising:
   a storage device for placing an article;
   a motion device for moving the shelf;
   a power device for providing energy to the motion device;
   a communication device configured to communicate with a control center;
   an article sensor that detects a storage state of each part of the storage device; and
   a controller that controls communication of the communication device with the control center and controls motion of the motion device,
   wherein the controller is configured to send a path planning request to the control center through the communication device in a case that it is determined a quantity of the article in the storage device has reached a predetermined threshold according to detection data of the article sensor, and receive a dispatching instruction which is generated by performing path planning by the control center according to a location of the shelf and a location of a delivery vehicle.

2. The shelf according to claim 1, wherein,
   the controller is configured to drive the motion device to move the shelf according to a path information in a dispatching instruction, in the case that the communication device receives the dispatching instruction from the control center.

3. The shelf according to claim 1, wherein the storage device comprises at least one of the following structures: a telescopic structure that adjusts a size of a storage space according to a control signal from the controller;
   or
   a separator that adjusts its position in the storage space according to the control signal from the controller.

4. The shelf according to claim 1, further comprising one or more of the following structures:
   a tag to be identified by at least one of an article sorting device or a staff;
   a display device that displays at least one of a storage state of the storage device or an endurance of the power device; or
   a lighting device that adjusts a brightness of an illuminated area according to an ambient light condition.

5. The shelf according to claim 1, wherein
the controller is further configured to perform at least one of the following operations in the case that an endurance of the power device reaches a predetermined lower limit: controlling the motion device to move the shelf to reach an energy charging area so as to charge energy; or controlling the power device to charge energy.

6. The shelf according to claim 1, wherein the shelf conforms to one or more of the following conditions:
the motion device is located at the bottom of the shelf;
a lower area of the storage device is a large article loading area; or
the shelf has a height no more than 2 meters.

7. A dispatching method, comprising:
obtaining, by a shelf, a dispatching instruction from a control center;
obtaining a path information from the dispatching instruction;
driving a motion device of the shelf to lead to a motion of the shelf according to the path information;
obtaining a storage state of the shelf; and
sending a path planning request to the control center in the case that a quantity of the carried article on the shelf reaches a predetermined threshold, so that the control center performs path planning according to a location of the shelf and a location of a delivery vehicle, and feeds back the dispatching instruction.

8. The method according to claim 7, wherein the quantity of the carried article on the shelf reaches the predetermined threshold comprises at least one of the followings:
the quantity of the carried article on the shelf reaches a predetermined maximum value during a loading process; or
the article on the shelf is cleared during an unloading process.

9. The method according to claim 7, further comprising at least one of the followings:
adjusting a telescopic structure to adjust a size of a storage space according to a telescopic structure adjustment instruction from the control center;
or
adjusting a location of a separator in the storage space according to a separator adjustment instruction from the control center.

10. The method according to claim 7, further comprising:
obtaining an endurance of the shelf;
performing at least one of the following operations when the endurance reaches a predetermined endurance threshold:
controlling the shelf to reach an energy charging area to charge energy, or controlling a power device of the shelf to charge energy.

11. A dispatching method, comprising:
obtaining a location information of a shelf and a location information of a delivery vehicle;
planning a path according to the location information of the shelf and the location information of the delivery vehicle to obtain a path information; and
sending a dispatching information including the path information to the shelf,
wherein, planning path and sending a dispatching information to the shelf in a case of obtaining a dispatching request from the shelf, and the shelf sending a path planning request to a control center in a case that a quantity of a carried article on the shelf reaches a predetermined threshold.

12. The method according to claim 11, wherein obtaining the location information of the delivery vehicle comprises:
determining identifiers of target delivery stations of delivery vehicles according to identifiers of the delivery vehicles;
determining a delivery vehicle heading for a target delivery station according to an identifier of the target delivery station; and
obtaining a location information of the delivery vehicle heading for the target delivery station.

13. The method according to claim 11, wherein,
planning path and sending a dispatching information to the shelf in the case of obtaining a dispatching operation from a staff.

14. The method according to claim 11, further comprising at least one of the following:
sending an article loading instruction to an article sorting device which corresponding to an identifier of the shelf in the case that the shelf is located at a warehousing station;
sending an unloading instruction to the article sorting device in the case that the shelf is located at a delivery station;
obtaining a location information of the shelf and a target location information of the shelf at the warehousing station in the case that the delivery vehicle arrives at the warehousing station; performing path planning, and sending a get-off instruction including a path information to the shelf;
or
obtaining the location information of the shelf and the target location information of the shelf at the delivery station in the case that the delivery vehicle arrives at the delivery station; performing path planning, and sending a get-off instruction including a path information to the shelf.

15. A dispatching device, comprising:
a memory; and
a processor coupled to the memory, wherein the processor is configured to perform a method according to claim 8 based on instructions stored in the memory.

16. A non-transitory computer readable storage medium having stored thereon computer program instructions which, when executed by a processor, implement steps of a method according to claim 7.

17. An operation dispatching system, comprising:
a shelf that includes:
a storage device for placing an article,
a motion device for driving motion of the shelf,
a power device for providing energy to the motion device,
a communication device that communicates with a control center, and
a controller that controls communication of the communication device with the control center and controls motion of the motion device;
and
an operation dispatching center configured to execute a dispatching method according to claim 11.

18. The operation dispatching system according to claim 17, further comprising at least one of the following devices:
an article sorting device configured to perform at least one of the following functions of: loading an article to the shelf; or unloading the article from the shelf; or
a delivery vehicle configured to send a location information to the operation dispatching center, move between a warehousing station and a delivery station according to a path planning result of the operation dispatching center based on a distribution instruction of the operation dispatching center, and send a get-off request of the shelf to the operation dispatching center when a target location is arrived.

* * * * *